UNITED STATES PATENT OFFICE.

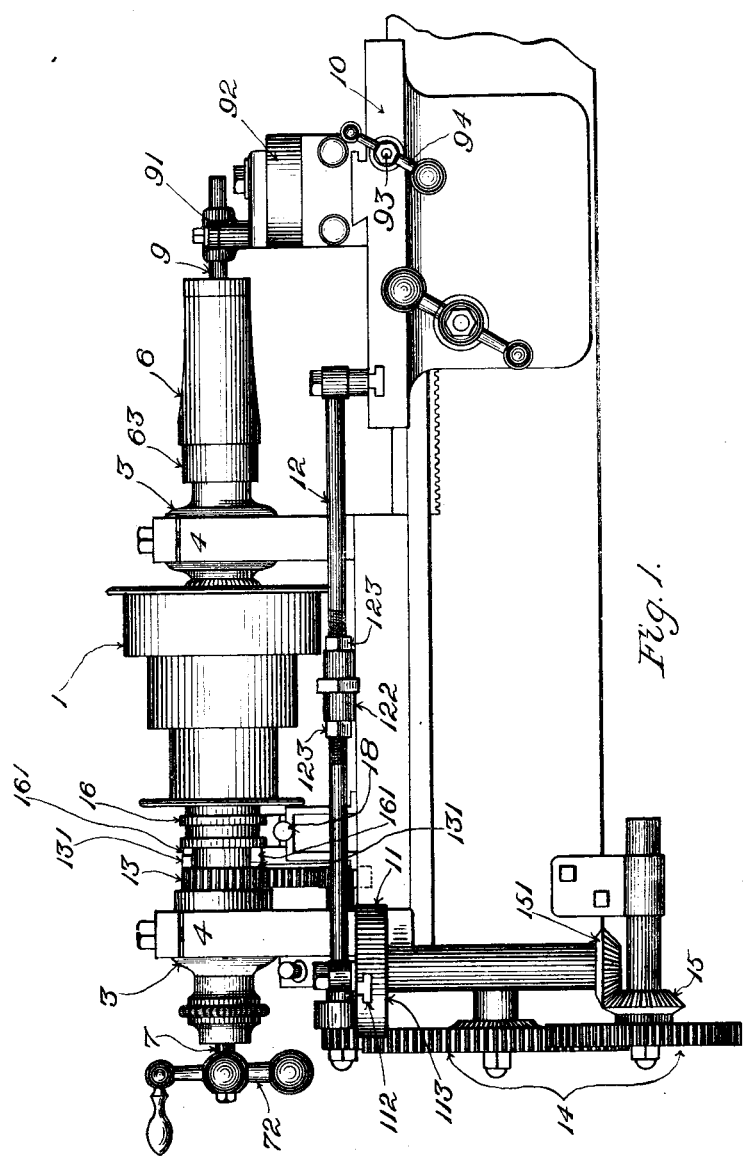

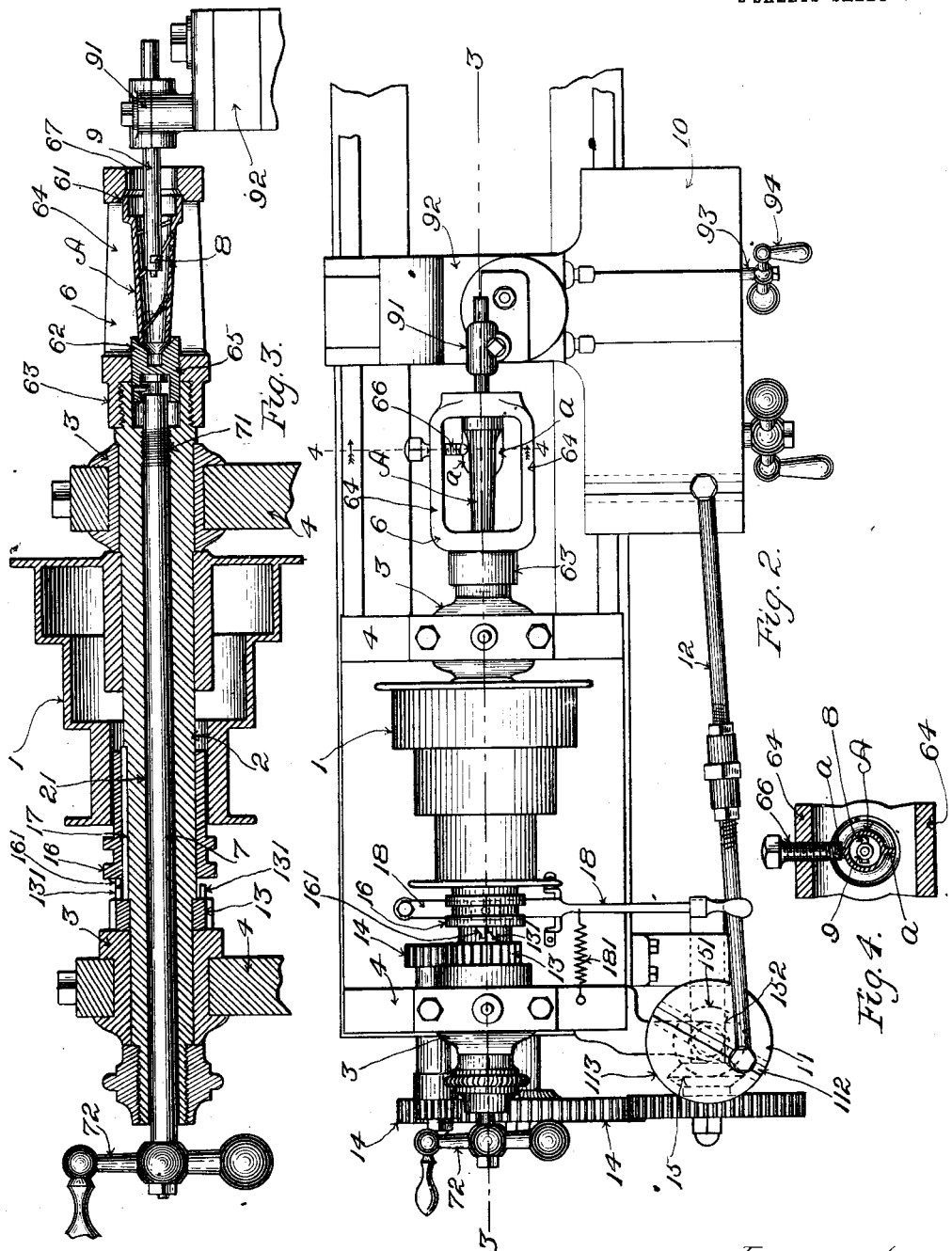

ISAAC OSGOOD, OF AMESBURY, MASSACHUSETTS.

ENGINE-LATHE.

1,064,988.  Specification of Letters Patent.  Patented June 17, 1913.

Application filed December 6, 1901. Serial No. 84,921.

*To all whom it may concern:*

Be it known that I, ISAAC OSGOOD, a citizen of the United States, residing at Amesbury, in the county of Essex, State of Massachusetts, have invented a certain new and useful Improvement in Engine-Lathes, of which the following is a specification, reference being had therein to the accompanying drawings.

In my U. S. Letters Patent No. 630,556, granted Aug. 8, 1899, for improvement in axle bearings, I have shown and described an axle-bearing or axle-box having the interior bearing surface thereof formed with a continuous or endless lubricant-distributing groove leading with a spiral first in one direction along the interior surface of the axle-box and then in the opposite direction, returning upon itself at each extremity of its course. In practice, in constructing axle-bearings or axle-boxes under the said Letters Patent, it is customary to form the axle-bearing or axle-box with two grooves answering to the foregoing description, symmetrically disposed with relation to each other within the axle-bearing or axle-box, and crossing each other.

The object of the invention is to provide means for forming automatically one or more continuous spiral grooves such as aforesaid in an axle-bearing or other object, either interiorly thereof, as aforesaid, or exteriorly thereof, as, for instance, in the spindle which fits within the axle-bearing or axle-box.

The invention consists in the improvement in lathes which I will now proceed to describe with reference to the accompanying drawings, in which latter I have illustrated an embodiment of the invention which has been contrived with more especial reference to forming continuous spiral grooves upon the interior surfaces of axle or other bearings.

The main features of the invention are applicable, with suitable modification in the practical embodiments of the same, in the production of grooves either interiorly or exteriorly of the work, as required in practice, although certain minor features thereof herein presented have been designed with reference more especially to the production of grooves interiorly.

In the drawings,—Figure 1 shows in front elevation a lathe containing the said embodiment of the invention. Fig. 2 shows the same in plan. Fig. 3 is a view mainly in vertical section on the plane indicated by the dotted line 3—3 in Fig. 2. Fig. 4 is a transverse section on line 4—4 of Fig. 2.

Having reference to the drawings,—1 is the driving cone or step pulley, the same being fixed on the spindle or mandrel 2, which latter is journaled as usual in bearings 3, 3, in the head-stock 4 of the lathe. One end of the spindle or mandrel 2 has applied thereto the work-holding chuck. In practice, the chuck which is applied to the spindle or mandrel 2 is constructed to suit the work in hand; that is to say, the work-holding chuck will vary according to the requirements and shape of the work. I have illustrated a chuck 6 of novel and improved character which I have designed for use more especially in grooving as aforesaid the interior of a bearing or other part in which it is desired to form one or more grooves. The said chuck is provided with a fixed center 61, which is in the form of a socket constructed to receive within it one end of the work, and with an opposite center 62 which is longitudinally movable with respect to the work and is suitably constructed to engage with the opposite end of the work. If preferred, the center 62 may be formed as a socket as shown to receive within it the said opposite end of the work. The precise character of center 62 is not material. An axle-bearing A is shown in position in the said chuck, clamped between the said sockets 61, 62. The portions of the sockets which receive the two ends of the work have an inward taper, as shown, which enables the chuck to properly center the work in being tightened upon the latter, and also enables the work to become firmly seated and held. For convenience of construction, the chuck is provided with a hub 63 which is fitted upon the inner end of the mandrel, it being secured thereto in convenient manner. The said hub and the mandrel are shown as in screw-threaded engagement with each other, but other means of attachment may be adopted in practice if desired. As a part of the illustrated construction of the work-holding chuck, opposite arms 64, 64, extend longitudinally from the said hub 63 and have the fixed center or socket 61 formed or applied at their outer extremities. In the present instance, also, the longitudinally movable center 62 is formed as a block which is fitted to a central hole 65 that is formed in the hub 63 of the chuck, the end of the spindle or mandrel 2 being chambered out to receive the block when the latter is retracted. For the convenient operation of the movable center, it is attached to the inner end of a rod 7. This rod is contained within the central longitudinal bore 21 of the spindle or mandrel. It is formed with a screw-thread 71 upon its exterior, engaging with a corresponding interior screw-thread within the said bore of the spindle or mandrel, and is provided with a handle 72 by means of which it may be turned. By taking hold of the handle 72 and turning the rod 7 within the spindle or mandrel 2, the rod and movable center 62 may be caused to move longitudinally of the mandrel so as to clamp the work between the movable center and the fixed center or socket, or to release the work, according as the handle and rod are turned in one direction or the other. In order to permit of the introduction of the work into the work-holding chuck, the movable center is retracted, which enables the work to be inserted into place through one of the openings between the side arms of the chuck, after which the movable center is operated to clamp the work between itself and the fixed center or socket. The removal of the work from the chuck is permitted by retracting the movable center.

Suitable provisions will of course be made in connection with the chuck for compelling the work to turn in unison with the chuck during the performance of the grooving operation. Such provisions will vary in practice, according to requirements. Axle-bearings or axle-boxes commonly are provided with longitudinal fins $a$, $a$, which are cast or otherwise formed upon their exteriors. In the present instance, I have provided the work-holding chuck 6 with a projection 66 to engage with one of the said fins $a$, $a$, on the axle-bearing or axle-box A which is held by the chuck, in order to compel the work to turn in unison with the chuck. The inner end of the said projection preferably is notched or slotted, as shown in Fig. 4, and receives within its notch or slot the fin with which it engages. Preferably, the projection with which the chuck is provided for engagement with the work as aforesaid is made adjustable radially in order to accommodate different diameters of axle-bearings or axle-boxes. Therefore, in the present construction, the said projection 66 is constituted by a screw that is fitted to a threaded hole tapped in one of the side arms of the chuck so that by turning the screw its inner end may be located at the distance from the center of rotation which is required by the diameter of the work being operated upon.

The bit or cutter 8 constituting the tool for performing the grooving is carried by a longitudinally disposed bar 9. In order to enable the work to be grooved interiorly by means of the said bit or cutter, the fixed center or socket 61 of the chuck 6 is formed with a central opening 67 through which the said bar extends into the interior of the axle-bearing or axle-box A mounted in the chuck. The said bar is clamped to the upwardly extending post 91 of the tool-carrying slide 92, which last is supported upon the slide-rest 10, it having in connection therewith a feed-screw 93 provided with a handle 94 by means of which handle the said feed-screw may be turned to shift the tool-carrying slide 92 transversely with relation to the work, as required in order to effect the cutting, or to withdraw the bit or cutter from the groove in the work.

One important part of the invention resides in the means whereby I produce a relative go-and-return traverse of the work and tool relatively to each other as required in order to produce in the work a continuous spiral groove returning upon itself at each extreme of its length. The essentials of the same comprise a rotating crank or its equivalent, and motion-transmitting connections combined therewith. The crank that is employed in the illustrated embodiment of the invention is designated 11 and, preferably, motion is transmitted from the said crank 11 to the slide-rest 10, a connecting rod 12 being the medium of transmission. The rotation of the crank 11 is timed suitably with reference to that of the work to suit the pitch of spiral groove that is desired.

An important feature of the invention consists in providing the lathe with means for enabling the length of the spiral groove that is formed in the work to be varied at will. To this end, I combine with the crank or its equivalent, and the transmitting connections, means of varying the extent of the relative go-and-return traverse between the tool and the work. The precise manner of carrying this feature of the invention into effect may be varied in practice. Herein, I employ a variable-throw crank, having the crank-pin thereof adjustable radially within the slot 112 of the crank-disk 113. Adjustment of the crank-pin toward and from the center of rotation of the said crank-disk will vary the throw of the crank as required in order to secure the desired length of traverse of the slide-rest and tool. The connecting rod is of extensible or telescopical construction, rendering it variable in length in order to enable the path traversed by the slide-rest to be shifted nearer to or farther from the head-stock, as may be necessary in practice in causing the groove or grooves to be formed in the right portion of the length of the work. In its illustrated form the said connecting-rod is composed of two main portions which are screw-threaded at their proximate ends, the screw-threads being respectively right-hand and left-hand, the said portions being connected together by means of a right-and-left nut 122, in connection with which check-nuts 123, 123, are employed.

For the purpose of insuring proper timing between the traverse and the rotation of the work, the crank 11 is rotated by means of gearing connecting the said crank with the spindle or mandrel 2. Thus, a gear 13 is mounted on the said spindle or mandrel, it transmitting motion through a train of spur-gearing 14, 14, &c., to a bevel-gear 15, the latter meshing with another bevel-gear 151, which is fast on a short vertical shaft 152 carrying the crank-disk 113 at its upper end. Change-gears are included in the said train of spur-gearing for the purpose of enabling the ratio between the revolutions of the crank and those of the mandrel to be varied as required in practice in order to secure the desired pitch in forming the groove in the work. I consider a rotating eccentric or cam an equivalent of the crank 11.

In order to enable the traverse-mechanism to be thrown into and out of operation as and when required, provision is made for shipping and unshipping the power connections of the traverse-mechanism into and out of operative or driving relations. In the present embodiment of the invention, the gear 13 on the spindle or mandrel is mounted loosely upon the latter, and is arranged to be made fast with the spindle or mandrel or disconnected therefrom at will by suitable clutch-devices. These last may vary in practice without involving necessarily a departure from the broad principles of the invention. Herein one form of clutch-devices is shown, comprising a hub 16 movable upon the exterior of the mandrel and connected therewith to turn in unison therewith by means of a spline 17, the gear 13 and hub 16 having interengaging teeth or projections 131, 161. A suitable shipper-handle or shipper-lever 18 is provided, by means of which the clutch-hub 16 may be moved lengthwise of the mandrel 2 into and out of engagement with the gear 13. Normally, the clutch-hub is held in engagement with the gear through the action of a spring 181 which is connected with the shipper-lever. When it is desired to unclutch the traverse-mechanism, the shipper-lever is moved in opposition to the said spring.

For the purpose of enabling two or more grooves to be formed in the work in predetermined positions with relation to one another, I make provision whereby, after one other groove has been produced in the work, a relative rotary shift of the work and tool of a predetermined definite extent is enabled to be effected. Thereby the succeeding spiral groove is caused to be produced in a predetermined different portion of the work. This provision for relative rotary shift may be made in various ways. It is very conveniently made at the clutch just referred to. Thus, one or both of the clutch-members, herein the gear 13 on the mandrel is provided with a number of clutch-teeth or projections, as 131, 131, corresponding with the number of grooves required to be formed in the work, the arrangement of the said clutch-teeth or projections on the said clutch-member with relation to each other corresponding with that which it is desired the grooves should have to each other in the work. On the completion of one groove, or after the attendant has retracted the tool or cutter from the said groove sufficiently to clear the work, the shipper-lever 18 is operated by the attendant to move the clutch-hub 16 sufficiently to withdraw its clutch-tooth or projection 161 from the clutch-tooth or projection on the said gear 13 with which it co-acted during the formation of the said groove, and then after the said clutch-tooth or projection 161 of the clutch-hub has been caused to pass or escape the said clutch-tooth or projection of the gear the clutch-hub is moved reversely so as to cause the clutch-tooth or projection 161 of the same to engage with the next succeeding or opposite clutch-tooth or projection of the gear 13. During the dwell or lost-motion of the traverse mechanism which is permitted by the procedure just described, a rotary shift of the work relative to the tool or cutter will take place, which will cause the next groove to be properly spaced in the work with respect to the preceding groove. The tool or cutter will then be advanced by the attendant so as to act properly against the work, and the second groove will be produced.

In the present instance I have shown the loose gear 13 on the mandrel 2 provided with diametrically opposite clutch-teeth or projections, as required for producing two spiral grooves in the work symmetrically disposed with relation to each other. Should more than two grooves in the work be desired, as, for example, three, the gear 13 would be provided with a corresponding number of clutch-teeth or projections properly spaced apart around the same.

While I have shown and described my invention as embodied in a machine, for forming lubricating grooves in the interior of an axle-bearing, it will of course be obvious that all the features of my invention are not necessarily restricted to use in this precise connection and for this particular purpose. The main essential principles, as will be clear, are equally well adapted for use in forming continuous spiral grooves for lubrication or other purposes in the exterior surface of the work, as, for example, in the exterior of the spindle of an axle, and I regard such use as wholly within the scope of my invention.

I claim as my invention:—

1. In a lathe, in combination, means for revolving a cylindrical piece of work on its longitudinal axis, a tool having a cutting position substantially radial with respect to the said axis, means for causing a relative traverse lengthwise of the longitudinal axis of the work first in the direction toward one end of the work and then reversely toward the other end, and thereby cutting a continuous or endless reverse spiral groove in the work, winding around the length of the latter spirally first in one direction and then reversely.

2. In a lathe, in combination, a work-holder for a cylindriform bearing or other like article, a tool-holder, means for producing a slow relative go-and-return traverse of the work-holder and tool lengthwise of the axis of rotation of the work, means for causing one or more complete rotations of the work-holder to each complete go-and-return traverse and thereby producing in the said bearing a longitudinally-winding endless or return spiral oil-groove, and means for suspending action of said traverse mechanism temporarily to secure a rotary shift of the work and tool relative to each other and cause a succeeding oil-groove to be produced in a different portion of the work.

3. In a lathe, in combination, a work-holder for a cylindriform bearing or other like article, a tool-holder, a crank, connections through which said crank produces a slow relative go-and-return traverse of the work-holder and tool lengthwise of the axis of rotation of the work, means for causing one or more complete rotations of the work-holder to each complete go-and-return traverse and thereby producing in the said bearing a longitudinally-winding endless or return spiral oil-groove, and means to occasion a relative rotary shift of the work and tool to cause a succeeding endless spiral oil-groove to be produced in a predetermined different portion circumferentially of the work.

4. In a lathe, in combination, a chuck having an open socket which receives one end of an axle-box or other hollow piece of work, a center for the other end of said piece, means for rotating the said chuck, a tool-support, a tool carried thereby which passes through the opening of said socket into the interior of the work, and means for causing a relative traverse of the chuck and tool-support and thereby producing an internal spiral groove in the work.

5. A lathe comprising, essentially, the work-holder, the tool-support, traverse-mechanism for occasioning a go-and-return traverse longitudinally of the work whereby a continuous spiral groove returning upon itself at each extreme of its length is adapted to be produced in the work, and driving connections for said work-holder and traverse-mechanism, including a clutch-device constructed to occasion a rotary relative shift between the work and tool to enable a succeeding spiral groove to be produced in a predetermined different portion of the work.

6. A lathe comprising, essentially, the work-holder, the tool-support, traverse mechanism for occasioning a go-and-return traverse longitudinally of the work whereby a continuous spiral groove returning upon itself at each extreme of its length is adapted to be produced in the work, and driving connections for said work-holder and traverse-mechanism, including a clutch-device comprising essentially a member having an engaging tooth or projection and a second member having a plurality of engaging teeth or projections, whereby to occasion a rotary relative shift of the work and tool to enable a succeeding spiral groove to be produced in a predetermined different portion of the work, substantially as described.

7. A lathe comprising, essentially, the mandrel and work-holder, the tool-support, traverse-mechanism for occasioning a go-and-return traverse longitudinally of the bed whereby a continuous spiral groove returning upon itself at each extreme of its length is adapted to be produced in the work, driving connections for said work-holder and traverse mechanism, including a sliding clutch-member splined to the mandrel and a loose clutch-member co-acting with said sliding clutch-member, one of said members having a plurality of engaging teeth or projections and the other thereof a corresponding projection whereby to occasion a rotary relative shift of the work and tool to enable a succeeding spiral groove to be produced in a predetermined different portion of the work, substantially as described.

8. A lathe comprising, essentially, a work-holder, a tool-support, a crank, means for transmitting a go-and-return traverse from said crank longitudinally of the bed, driving connections for the parts for producing a plurality of rotations of said work-holder and tool-support relative to each rotation of said crank to cause a continuous spiral groove returning upon itself at each extreme of its length to be produced in the work, the said driving connections including a clutch-device comprising essentially a member having an engaging tooth or projection and a second member having a plurality of engaging teeth or projections, whereby to occasion a relative shift of the work and tool to enable a succeeding spiral groove to be produced in a predetermined different portion of the work, substantially as described.

9. In a machine for forming continuous return spiral grooves in journal bearings, a rotary shaft, a chuck secured to the shaft for supporting and rotating a journal bearing, a rotary disk, means for transmitting motion from the shaft to the disk, a cross head movable lengthwise of the axis of the shaft, a rigid connecting rod having one end pivoted to the disk at one side of the axis thereof and its other end pivoted to the cross head, and a tool post mounted on the cross head and provided with a cutting tool projected therefrom toward the chuck a distance equal to or greater than the distance between the axis of the disk and pivotal connection between said disk and connecting rod.

10. In a machine for forming continuous return spiral grooves in journal bearings, a lathe comprising a main supporting frame, a rotary chuck for supporting a journal bearing, a driving-shaft for the chuck, a rotary disk at the front side of the frame and provided with a diametric slot, a stud adjustable lengthwise of said slot, means for clamping the stud in its adjusted position, a cross-head movable lengthwise of the frame toward and from the chuck, an extensible connection between the said cross-head and the stud on the disk, and a tool-post mounted on the cross-head and provided with a tool projecting therefrom toward the chuck a distance equal to or greater than the distance between the axis of the disk and center of the stud mounted thereon.

11. In a machine for forming continuous return spiral grooves in journal bearings, a lathe comprising a main supporting frame, a rotary chuck for supporting a journal bearing, a driving shaft for the chuck, a rotating crank of variable throw, a cross-head movable lengthwise of the frame toward and from the chuck, an extensible connection between said cross-head and said crank, and a tool-post mounted on the cross-head and provided with a tool projecting therefrom toward the chuck a distance equal to or greater than the radius of the crank.

In testimony whereof I affix my signature, in presence of two witnesses.

ISAAC OSGOOD.

Witnesses:
CHAS. F. RANDALL,
EDITH J. ANDERSON.